United States Patent

Ebel et al.

[11] Patent Number: 6,040,420
[45] Date of Patent: Mar. 21, 2000

[54] POLYFORMAMIDES AND POLYAMINES

[75] Inventors: Klaus Ebel, Lampertheim; Hans-Joachim Hähnle, Neustadt, both of Germany

[73] Assignee: BASF Aktiengesellschaft, Ludwigshafen, Germany

[21] Appl. No.: 09/246,870

[22] Filed: Feb. 8, 1999

Related U.S. Application Data

[62] Division of application No. 08/839,801, Apr. 18, 1997.

[30] Foreign Application Priority Data

Apr. 19, 1996 [DE] Germany .................. 196 15 485

[51] Int. Cl.[7] .................. C08F 6/00; C08F 20/00; C08F 8/00; C08F 120/00; C08L 79/02
[52] U.S. Cl. .................. 528/480; 528/483; 528/487; 528/488; 528/499; 525/329.1; 525/338; 525/339

[58] Field of Search .................. 528/480, 422, 528/483, 487, 499, 488; 525/329.1, 338, 339

[56] References Cited

U.S. PATENT DOCUMENTS

| | | | |
|---|---|---|---|
| 2,817,649 | 12/1957 | Contois | 525/329.1 |
| 3,948,870 | 4/1976 | Stoy et al. | 528/499 |
| 4,525,534 | 6/1985 | Rasshofer | 528/422 |
| 5,436,299 | 7/1995 | Ford et al. | 515/370 |

*Primary Examiner*—P. Hampton-Hightower
*Attorney, Agent, or Firm*—Keil & Weinkauf

[57] ABSTRACT

Polymers which contain N-substituted formamide structural units, obtainable by catalytic reaction of nitrile-containing polymers in the presence of hydrogen, carbon monoxide and/or carbon monoxide-releasing compounds, are described.

20 Claims, No Drawings

POLYFORMAMIDES AND POLYAMINES

CROSS-REFERENCE TO RELATED APPLICATION

The present application is a Divisional Application of U.S. application Ser. No. 08/839,801, filed on Apr. 18, 1997.

FIELD OF THE INVENTION

The present invention relates to a process for the preparation of polymers which contain N-substituted formamide structural units, by catalytic reaction of nitrile-containing polymers in the presence of hydrogen, carbon monoxide and/or carbon monoxide-releasing compounds, a process for the preparation of polyamines by hydrolysis of polymers which contain N-substituted formamide structural units, polymers which contain N-substituted formamide structural units, polyamines, and the use of the polymers which contain N-substituted formamide structural units for the preparation of polyamines.

DESCRIPTION OF THE RELATED ART

The polymers according to the invention, which contain N-substituted formamide structural units

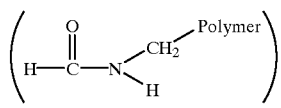

are called polyformamides according to the invention, for the sake of simplicity, in the following; the polymers according to the invention, which contain amine structural units, are for the same reason called polyamines according to the invention in the following.

Polyamines play a large part as auxiliaries in the paper industry, in wastewater treatment and in the mineral oil industry.

Until now, they were mainly prepared by ethylene/amine polymerization. These polymers, however, are relatively expensive.

BRIEF SUMMARY OF THE INVENTION

It is an object of the present invention to make available polyamides and polyamines from inexpensive starting materials using an industrially simple and widely employable process.

We have found that this object is achieved by a process for the preparation of polymers which contain N-substituted formamide structural units by a catalytic reaction of nitrile-containing polymers in the presence of hydrogen, carbon monoxide and/or carbon monoxide-releasing compounds and a process for the preparation of polyamines by hydrolysis of polymers which contain N-substituted formamide structural units and which are obtainable by catalytic hydrogenation/reaction of nitrile-containing polymers in the presence of hydrogen, carbon monoxide and/or carbon monoxide-releasing compounds.

We have furthermore found polymers which contain N-substituted formamide structural units and which are obtainable by catalytic reaction of nitrile-containing polymers in the presence of hydrogen, carbon monoxide and/or carbon monoxide-releasing compounds, polyamines obtainable by hydrolysis of polymers which contain N-substituted formamide structural units and which are obtainable by catalytic reaction of nitrile-containing polymers in the presence of hydrogen, carbon monoxide and/or carbon monoxide-releasing compounds, and the use of the polyformamides according to the invention for the preparation of the polyamines according to the invention.

DETAILED DESCRIPTION OF THE INVENTION

Suitable nitrile-containing polymers are all polymeric compounds which contain at least one nitrile group (—CN). The nitrile group or the nitrile groups can be present as end group(s) or preferably as side groups.

The average content of the nitrile groups in the polymer (calculated as acrylonitrile) is in general in the range from 10 to 100 mol %, preferably from 30 to 100 mol %, based on the total amount of monomers in the polymer.

Highly suitable nitrile-containing polymers are those which are obtainable by homopolymerization of $\alpha,\beta$-unsaturated $C_3$- to $C_7$-nitriles, such as acrylonitrile or methacrylonitrile, or which are obtainable by the copolymerization of the described $\alpha,\beta$-unsaturated nitriles with olefinically unsaturated $C_2$- to $C_{20}$-monomers, such as ethylene, propene, 1,3-butadiene or preferably styrene.

Polymers of this type, as well as processes for their preparation, are known and described, for example, in Kirk-Othmer, Encycl. Chem. Techn., IVth Ed., Vol. 1, Acrylonitrile Polymers, pp. 370–411 and Vol. 10, Fibers (Acrylic), pp. 559–598.

The nitrile-containing polymers preferably used are acrylonitrile homopolymers, in particular those having a molecular weight $\overline{M}_w$, measured by the light-scattering method, in the range from 1000 to 10,000,000, preferably in the range from 5000 to 5,000,000.

In general, the nitrile-containing polymer is reacted in the presence of a transition metal catalyst with hydrogen, carbon monoxide and/or carbon monoxide-releasing compounds, at a pressure in the range from 50 to 600 bar, preferably in the range from 150 to 400 bar, and a temperature in the range from 20 to 300° C., preferably in the range from 100 to 250° C.

Customarily, this reaction is carried out in organic solvents, such as formamides or pyrrolidones, and preferably in pyrrolidones such as N-methylpyrrolidone.

Suitable transition metal catalysts are known to the person skilled in the art, inter alia, as hydrogenation catalysts and are commercially available.

Highly suitable metals have turned out to be the transition metals of the first and fourth to tenth subgroup of the Periodic Table of the Elements, preferably iron, platinum, palladium, tungsten, uranium, nickel, rhenium, rhodium, manganese, ruthenium, copper, cobalt and in particular iron.

Particularly suitable transition metal catalysts to be mentioned are carbonyl, hydrido or phosphine complexes of iron, platinum, palladium, tungsten, chromium, nickel, rhenium, rhodium, manganese, ruthenium or molybdenum, but also heterogeneous catalysts such as palladium or platinum on activated carbon, Raney nickel or Raney cobalt.

The molar ratio of hydrogen to carbon monoxide is in general in the range from 10:1 to 0.1:1, but preferably in the range from 4:1 to to 0.25:1. Very good results are customarily achieved if synthesis gas (hydrogen:carbon monoxide—molar ratio=1:1) is used.

The molar ratio of carbon monoxide to nitrile groups is in general in the range from 1:1 to 10,000:1, preferably in the range from 1:1 to 1000:1.

The molar ratio of hydrogen to nitrile groups is in general in the range from 2:1 to 10,000:1, preferably in the range from 2:1 to 1000:1.

Instead of carbon monoxide or preferably together with carbon monoxide, carbon monoxide-releasing compounds can be employed as carbonylating agents.

Carbon monoxide-releasing compounds are to be understood as meaning those chemical compounds which release carbon monoxide under the reaction conditions according to the invention.

Highly suitable compounds of this type are, for example, formic acid or its derivatives such as formamides and formates, in particular formamides.

The molar ratio of carbon monoxide-releasing components to nitrile groups of the nitrile-containing polymers is in general in the range from 1:1 to 100:1.

The polyformamides according to the invention obtainable by the process according to the invention in general contain the structural unit

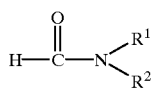

where $R^1$ is hydrogen or an organic carbon substituent and $R^2$ is an organic carbon substituent, the organic carbon substituent on the nitrogen atom being bonded to the polymer chain.

The polyformamides according to the invention obtainable by the process according to the invention in general further contain from 0 to 80 mol %, preferably from 0 to 50 mol %, of nitrile groups as determined by means of IR spectroscopy:

1.5 g of substance are homogenized in 450 mg of KBr and measured in transmission as a KBr pellet. The reference sample is polyacrylonitrile (starting substance).

Assessment is carried out according to the formula

% conversion=$(1-E_{CN\ (sample)}/E_{CN\ (polyacrylonitrile)}) \times 100$ $E_{CN\ (sample)}$=extinction of the CN band of the sample $E_{CN\ (polyacrylonitrile)}$=extinction of the CN band of the starting material polyacrylonitrile Beside the formamide groups, the polyformamides according to the invention can if desired further contain free amine groups and are in general readily soluble in aqueous acids, such as aqueous hydrochloric acid and can be reprecipitated by neutralization with bases, such as carbonates, hydrogencarbonates or hydroxides of alkali metals or alkaline earth metals.

By hydrolysis of the polyformamides according to the invention, which is known to the person skilled in the art, if appropriate in the presence of acids or bases, the polyamines according to the invention can be prepared from the polyformamides according to the invention.

Suitable hydrolysis conditions are temperatures in the range from 20 to 300° C. Preferably, the hydrolysis can be carried out in the presence of acids, preferably strong mineral acids having a $pK_a$ of less than 3, such as hydrochloric acid, sulfuric acid or hydrogensulfate or else in the presence of bases, preferably strong bases having a $pK_B$ of greater than 6, such as carbonates, hydrogencarbonates or hydroxides of alkali metals or alkaline earth metals. The hydrolysis can also be carried out in the presence of catalysts.

As a rule, the polyamines obtainable in this way have a total base content (total amine number), measured by titration of an acetic acid solution of the polyamine according to the invention with 0.5 M perchloric acid against Crystal Violet, in the range from 50 to 600, preferably in the range from 200 to 500.

The polyamines according to the invention can be used, for example, as retention and dewatering aids in paper manufacture.

EXAMPLES

Example 1

10.6 g of polyacrylonitrile (0.2 mol of acrylonitrile units) having a molecular mass $M_w$ of 15,000 (K value 1% strength in dimethylformamide (DMF): 28.4) were dissolved in 100 ml of N-methylpyrrolidone (NMP), treated with 3.9 g of iron pentacarbonyl and hydrogenated with 30,000 kPa of synthesis gas for 6 h in a 300 ml stirred autoclave at 220° C. The gas absorption was approximately 14 1. The NMP was then distilled off in vacuo, the red-brown residue was dissolved in half-concentrated hydrochloric acid and the product was precipitated by neutralization with sodium hydroxide solution. After drying in a vacuum drying oven at 70° C., 10 g of a brown powder having the following analytical data were obtained:

Iron content: 3.6%
Amine number: 180
Elemental analysis: C: 61.6%; H: 8.7%; N: 12.5%; O: 13.8%
Ash: 3.9%
Conversion of the nitrile groups (IR determination): 95%

Example 2

The reaction was carried out according to Example 1 with the following alterations:
Temperature: 200° C.
Instead of synthesis gas: 1000 kPa and 29,000 kPa of $H_2$
Gas absorption: 19 1
Iron content: 0.17%
Amine number: 267
Elemental analysis: C: 55.2%; H: 8.6%; N: 10.7%; O: 13.4%
Conversion of the nitrile groups (IR determination): 94%

Example 3

The reaction was carried out according to Example 2 with the following alterations:
3000 kPa of CO and 27,000 kPa of $H_2$
Gas absorption: 15 1
Iron content: 1.1%
Amine number: 219
Elemental analysis: C: 63.6%; H: 9.1%; N: 12.0%; O: 10.9%
Conversion of the nitrile groups (IR determination): 95%

Example 4

Hydrogenation Without CO Using DMF as CO Supplier 10.6 g of polyacrylonitrile (0.2 mol of acrylonitrile units) having a molecular mass $M_w$ of 15,000 were dissolved in 100 ml of DMF, treated with 3.9 g of iron pentacarbonyl and hydrogenated with 30,000 kPa of synthesis gas for 5 h in a 300 ml stirred autoclave at 200° C. The gas absorption was approximately 30 1. The NMP was then distilled off in vacuo, the red-brown residue was dissolved in half-concentrated hydrochloric acid and the product was precipitated by neutralization with sodium hydroxide solution.

After drying at 75° C., a brown powder having the following analytical data was obtained:
Iron content: 0.21%
Amine number: 126
Elemental analysis: C: 50.6%; H: 6.9%; N: 10.5%; O: 12.8%
Conversion of the nitrile groups (IR determination): 95%

Example 5

Reaction analogously to Example 1 with the following alteration:
Instead of polyacrylonitrile of molecular mass $M_w$ 15,000, polyacrylonitrile of molecular mass $M_w$ of 2.5 million (K value: 155) was employed.
Yield: 8.8 g
Gas absorption: 18 l
Iron content: 4%
Amine number: 270
Elemental analysis: C: 42.6%; H: 6.5%; N: 8.3%; O: 21.0%
Conversion of the nitrile groups (IR determination): 96%

Example 6

Reaction analogously to Example 1 with the following alteration:
Instead of polyacrylonitrile of molecular mass $M_w$ 15,000, polyacrylonitrile of molecular mass of 5 million (K value: 176) was employed. In this case the amount of polyacrylonitrile employed was halved to 5.3 g.
Yield: 3.0 g
Gas absoroption: 18 l
Iron content: 7.6%
Amine number: 285
Elemental analysis: C: 38.8%; H: 5.9%; N: 8.6%; O: 18.1%
Conversion of the nitrile groups (IR determnination): 98%

Examples 7–23

5.3 g of polyacrylonitrile of molecular mass $M_w$ 15,000 (K value: 25.3) were hydrogenated with synthesis gas (mixture of CO and $H_2$ in the molar ratio 1:1) at 220° C. and a pressure of 30,000 kPa for 6 h in 50 ml of NMP using 0.5 g of the appropriate catalyst. The pressure was kept constant by reinjection of synthesis gas. The NMP was then distilled off in vacuo, the residue was dissolved in half-concentrated hydrochloric acid, and the reaction product was precipitated from the hydrochloric acid by neutralization with sodium hydroxide solution, separated off by filtration or centrifugation, washed with water and dried. In this case, using various catalysts, the following results were obtained:

| Ex. No. | Catalyst | Gas abs. [l] | Yield [g] | Conversion*) [%] | Amine number |
|---|---|---|---|---|---|
| 7 | $Fe(CO)_5$ | 6.8 | 5.5 | 91 | 190 |
| 8 | $Pt[P(C_6H_5)_3]_4$ | 5.8 | 2.1 | 89 | 136 |
| 9 | $Pd[P(C_6H_5)_3]_4$ | 1.8 | 1.9 | 85 | 50 |
| 10 | $W(CO)_6$ | 4.8 | 4.8 | 90 | 252 |
| 11 | $Cr(CO)_6$ | 2.8 | 4.2 | 97 | 258 |
| 12 | 5% Pt on activated carbon | 6.4 | 1.9 | 84 | 130 |
| 13 | 5% Pd on activated carbon | 1.6 | 0.4 | 90 | 187 |
| 14 | $Ni(CO)_2[P(C_6H_5)_3]_2$ | 1.4 | 1.5 | 87 | 205 |
| 15 | $Re_2(CO)_{10}$ | 1.8 | 2.2 | 98 | 172 |
| 16 | $HRh[P(C_6H_5)_3]_4$ | 0.6 | 1.2 | 90 | 150 |
| 17 | $Mn_2(CO)_{10}$ | 1.2 | 4.3 | 96 | 172 |
| 18 | $H_2Ru[P(C_6H_5)_3]_4$ | 5.6 | 4.7 | 92 | 219 |
| 19 | $Mo[(C_6H_5)_2P-C_2H_4-P(C_6H_5)_2](CO_4)$ | 0.5 | 2.0 | 92 | 166 |
| 20 | Raney nickel | 6.4 | 3.9 | 98 | 155 |
| 21 | $HCu[P(C_6H_5)_3]_6$ | 2.4 | 3.3 | 93 | 134 |
| 22 | $Co(CO)_4$ | 3.2 | 1.3 | 98 | 327 |
| 23 | $Mo(CO)_6$ | 4.4 | 5.4 | 96 | 329 |

*) Conversion of the nitrile groups of polyacrylonitrile by determination by IR spectroscopy:

1.5 g of substance were homogenized in 450 mg of KBr and measured in transmission as a KBr pellet. The reference sample was polyacrylonitrile (starting substance).

Assessment was carried out according to the formula $$\% \text{ conversion} = (1 - E_{CN\ (sample)}/E_{CN\ (polyacrylonitrile)}) \times 100$$

$E_{CN\ (sample)}$=extinction of the CN band of the sample $E_{CN\ (polyacrylonitrile)}$=extinction of the CN band of the starting material polyacrylonitrile Example 24

Alkaline hydrolysis of polyformamide according to the invention 10 g of the polyformamide according to the invention from Example 1 were refluxed for 4 h with double the amount of 50% strength sodium hydroxide solution and about 6 times the amount of methanol. The black suspension obtained was filtered and the filtrate was evaporated in vacuo. The evaporation residue was dissolved in 50 ml of hydrochloric acid and then adjusted to pH=9 using sodium hydroxide solution and stirred for about 5 hours at 80° C. in air, and the precipitated material was isolated and dried.

4 g of a yellow solid having a total nitrogen base content of 10.5 g/100 g, of this 4.7 g/100 g of tert-N and 1.4 g/100 g of sec-N, were obtained.

Example 25

Acidic hydrolysis of polyformamide according to the invention 11 g of the polyformamide according to the invention from Example 1 were refluxed for 10 h with 120 ml of concentrated sulfuric acid and adjusted to pH 12 using sodium hydroxide solution to precipitate iron hydroxide. Iron hydroxide was filtered off and the filtrate was concentrated. 10.5 g of a water-soluble product having the following analytical data were obtained:
Iron content: <0.005% by weight
Sodium content: 11.7% by weight
Chloride content: 8.7% by weight
Ash content: 28.6% by weight
Amine number: 392
Water content: 10.6% by weight
Elemental analysis: C 47.3%; H 7.6%; N 8.4%; O 14.8%

We claim:
1. A process for the preparation of a polyamine, which process comprises
i) catalytically reacting a polymer comprising nitrile-containing repeating units in the presence of hydrogen and carbon monoxide and/or carbon monoxide- releasing compounds to give a polymer comprising N-substituted formamide structural units, and ii) hydrolyzing the polymer comprising N-substituted formamide structural units resulting from the catalytic reaction (i) to give the polyamine.

2. The process defined in claim 1, wherein the polymer which comprises nitrile-containing repeating units is a homopolymer of α,β-unsaturated $C_3$- to $C_7$-nitriles or is a copolymer of α,β-unsaturated $C_3$- to $C_7$-nitriles with monomers selected from the group consisting of ethylene, propene, 1,3-butadiene and styrene.

3. The process defined in claim 1, wherein the polymer which comprises nitrile-containing repeating units is a homopolymer of acrylonitrile or a copolymer of acrylonitrile with monomers selected from the group consisting of ethylene, propene, 1,3-butadiene and styrene.

4. The process defined in claim 1, wherein the polymer which comprises N-substituted formamide structural units further comprises nitrile-containing structural units.

5. The process defined in claim 4, wherein from 10 to 100 mol-% of the structural units of the polymer which comprises N-substituted formamide structural units have a nitrile group or an N-substituted formamide group.

6. The process defined in claim 4, wherein up to 50% of the structural units having a nitrile group or an N-substituted formamide group, have a nitrile group.

7. The process defined in claim 4, wherein the polymer which comprises nitrile-containing repeating units is a homopolymer of acrylonitrile or a copolymer of acrylonitrile with monomers selected from the group consisting of ethylene, propene, 1,3-butadiene and styrene.

8. The process defined in claim 7, wherein 16% of the structural units having a nitrile group or an N-substituted formamide group, have a nitrile group.

9. The process defined in claim 4, wherein the polymer which comprises N-substituted formamide structural units further comprises, as end groups or side groups, amino groups.

10. The process defined in claim 9, wherein from 10 to 100 mol-% of the structural units comprise a nitrile group, an N-substituted formamide group or an amino group.

11. The process defined in claim 9, wherein up to 50% of the structural units having a nitrile group, an N-substituted formamide group or an amino group have a nitrile group.

12. The process defined in claim 9, wherein 16% or less of the structural units having a nitrile group, an N-substituted formamide group or an amino group have a nitrile group.

13. The process defined in claim 9, wherein the polymer which comprises nitrile-containing repeating units is a homopolymer of acrylonitrile or a copolymer of acrylonitrile with monomers selected from the group consisting of ethylene, propene, 1,3-butadiene and styrene.

14. The process defined in claim 13, wherein 16% or less of the structural units having a nitrile group, an N-substituted formamide group or an amino group have a nitrile group.

15. A polyamine obtained by i) catalytically reacting a polymer comprising nitrile-containing repeating units in the presence of hydrogen and carbon monoxide and/or carbon monoxide-releasing compounds to give a polymer comprising N-substituted formamide structural units, and ii) hydrolyzing the polymer comprising N-substituted formamide structural units resulting from the catalytic reaction (i) to give the polyamine.

16. The polyamine defined in claim 15, wherein wherein the polymer which comprises nitrile-containing repeating units is a homopolymer of acrylonitrile or a copolymer of acrylonitrile with monomers selected from the group consisting of ethylene, propene, 1,3-butadiene and styrene.

17. The polyamine defined in claim 16, wherein the polymer which comprises N-substituted formamide structural units further comprises structural units having a nitrile group.

18. The polyamine defined in claim 17, wherein the polymer which comprises N-substituted formamide structural units further comprises structural units having an amino group.

19. The polyamine defined in claim 18, wherein the polymer which comprises N-substituted formamide structural units comprises from 10 to 100 mol-% of structural units having a nitrile group, an N-substituted formamide group or an amino group.

20. The polyamine defined in claim 19, wherein, in the polymer which comprises N-substituted formamide structural units, up to 20% of the structural units having a nitrile group, an N-substituted formamide group or an amino group have a nitrile group.

* * * * *